(12) United States Patent
De Rossi et al.

(10) Patent No.: US 11,702,549 B2
(45) Date of Patent: Jul. 18, 2023

(54) RECYCLABLE COATINGS AND USE THEREOF FOR PRINTING REUSABLE PLASTICS

(71) Applicant: MANKIEWICZ GEBR. & CO. (GMBH & CO. KG), Hamburg (DE)

(72) Inventors: Umberto De Rossi, Norderstedt (DE); Oliver Bolender, Hamburg (DE); Timo Steffen, Buxtehude (DE)

(73) Assignee: MANKIEWICZ GEBR. & CO. (GmbH & CO. KG), Hamburg (DE)

( * ) Notice: Subject to any disclaimer, the term of this patent is extended or adjusted under 35 U.S.C. 154(b) by 419 days.

(21) Appl. No.: 16/644,959

(22) PCT Filed: Aug. 14, 2018

(86) PCT No.: PCT/DE2018/100711
§ 371 (c)(1),
(2) Date: Mar. 6, 2020

(87) PCT Pub. No.: WO2019/047994
PCT Pub. Date: Mar. 14, 2019

(65) Prior Publication Data
US 2020/0263020 A1 Aug. 20, 2020

(30) Foreign Application Priority Data
Sep. 10, 2017 (DE) .................. 10 2017 008 456.4

(51) Int. Cl.
| | | |
|---|---|---|
| *C09D 4/00* | (2006.01) | |
| *C08L 33/08* | (2006.01) | |
| *B29B 17/02* | (2006.01) | |
| *B29K 67/00* | (2006.01) | |
| *B29L 31/00* | (2006.01) | |
| *C08F 222/10* | (2006.01) | |

(52) U.S. Cl.
CPC .............. *C09D 4/00* (2013.01); *C08L 33/08* (2013.01); *B29B 17/02* (2013.01); *B29B 2017/0217* (2013.01); *B29B 2017/0289* (2013.01); *B29K 2067/003* (2013.01); *B29L 2031/7158* (2013.01); *C08F 222/102* (2020.02); *C08L 2205/02* (2013.01)

(58) Field of Classification Search
CPC ....... C09D 4/00; C08L 33/08; C08L 2205/02; B29B 17/02; B29B 2017/0217; B29B 2017/0289; B29K 2067/003; B29L 2031/7158; C08F 222/102; Y02P 20/582
See application file for complete search history.

(56) References Cited

U.S. PATENT DOCUMENTS

| | | | |
|---|---|---|---|
| 6,787,197 B1 | 9/2004 | Jaworek et al. | |
| 2008/0255263 A1 | 10/2008 | Hong et al. | |
| 2011/0247654 A1 | 10/2011 | Uptergrove et al. | |
| 2014/0370254 A1 | 12/2014 | De Rossi et al. | |
| 2016/0002524 A1* | 1/2016 | Shimizu ................ | G02C 7/102 |
| | | | 252/586 |
| 2016/0090504 A1* | 3/2016 | Araki ................... | C09D 167/00 |
| | | | 522/64 |
| 2018/0171037 A1 | 6/2018 | Miyano et al. | |
| 2018/0251642 A1* | 9/2018 | Van Meulder ........... | C09D 5/00 |

FOREIGN PATENT DOCUMENTS

| | | |
|---|---|---|
| CN | 106519919 A | 3/2017 |
| DE | 10 2011 120 940 A1 | 6/2013 |
| EP | 1 218 461 | 12/2005 |
| JP | 2004-182914 A | 7/2004 |
| JP | 2009-511702 A | 3/2009 |
| JP | 2015-508325 A | 3/2015 |
| KR | 2011-0078320 A | 7/2011 |
| WO | WO 2012/003186 A1 | 1/2012 |
| WO | WO 2015/151833 A1 | 4/2017 |

* cited by examiner

*Primary Examiner* — Jessica M Roswell
(74) *Attorney, Agent, or Firm* — Norman B. Thot

(57) ABSTRACT

A coating material for the production of a UV-curing primer coating. The coating material includes 60 to 80 wt.-% of at least one difunctional, alcoxylated acrylate monomer, 5 to 15 wt.-% of at least one acrylate oligomer, 5 to 15 wt.-% of at least one carbonyl-functional acrylate and/or at least one methacrylate oligomer or 5 to 15 wt.-% of at least one polyethylene glycol acrylate and/or at least one polyethylene glycol methacrylate, and 1 to 10 wt.-% of at least one photoinitiator, each based on a total weight of the coating material.

23 Claims, No Drawings

RECYCLABLE COATINGS AND USE THEREOF FOR PRINTING REUSABLE PLASTICS

CROSS REFERENCE TO PRIOR APPLICATIONS

This application is a U.S. National Phase application under 35 U.S.C. § 371 of International Application No. PCT/DE2018/100711, filed on Aug. 14, 2018 and which claims benefit to German Patent Application No. 10 2017 008 456.4, filed on Sep. 10, 2017. The International Application was published in German on Mar. 14, 2019 as WO 2019/047994 A1 under PCT Article 21(2).

FIELD

The present invention relates to recyclable coatings and to coating systems for plastics which can be separated from the reusable plastics in conventional recycling methods without additional effort. The present invention also relates to methods for producing the coatings according to the present invention by inkjet printing methods which are in particular suitable for printing molded containers made of polyethylene terephthalate.

BACKGROUND

Due to its properties, polyethylene terephthalate (abbreviated: PET) is, for example, used for packaging and molded containers, for example, as containers for cosmetics and food products. In the food sector, non-returnable and returnable beverage bottles made of polyethylene terephthalate (abbreviated: PET bottels) are primarily used.

PET bottles and other packaging materials made of PET are in large part recovered and recycled. In common recycling processes, the material is comminuted to flakes, freed from foreign substances, sorted by color, and processed to granules. The granules thereby obtained can be reused to produce beverage bottles ("bottle to bottle" recycling). In the cleansing step, foreign substances such as impurities, labels or printings must be completely separated and removed from the substrate. Printing layers which are directly applied onto the PET substrate must therefore be removable via common cleansing steps in order to not disrupt established recycling processes.

WO 2012/003186 describes a UV-curing coating system for recyclable plastics which is directly printed onto the PET substrates by inkjet printing. The basic layer of this system is here made of hydrophylic and acid oligomers and monomers which swell in water during the usual cleansing steps of the recycling process and disbond the further layers. The instability of this coating system towards humidity and water, which is advantageous in the recycling process, is, however, disadvantageous in daily use.

SUMMARY

An aspect of the present invention is to provide improved coatings for recyclable plastic substrates which can be produced by inkjet printing.

In an embodiment, the present invention provides a coating material for the production of a UV-curing primer coating. The coating material includes 60 to 80 wt.-% of at least one difunctional, alcoxylated acrylate monomer, 5 to 15 wt.-% of at least one acrylate oligomer, 5 to 15 wt.-% of at least one of at least one carbonyl-functional acrylate and at least one methacrylate oligomer or 5 to 15 wt.-% of at least one of at least one polyethylene glycol acrylate and at least one polyethylene glycol methacrylate, and 1 to 10 wt.-% of at least one photoinitiator, each based on a total weight of the coating material.

DETAILED DESCRIPTION

The present invention provides that the primer coatings are produced from UV-curing coating materials, which contain at least:
60 to 80 wt.-% of at least one difunctional alcoxylated acrylate monomer;
5 to 15 wt.-% of at least one acrylate oligomer;
5 to 15 wt.-% of at least one carbonyl-functional acrylate and/or methacrylate oligomer or polyethyleneglycol acrylate and/or polyethyleneglycol methacrylate; and
1 to 10 wt.-% of at least one photoinitiator,
each in relation to the total weight of the coating material.

The primer coating materials can also contain surfactants. Suitable surfactants are modified poly(organo)siloxanes and polyether-substituted polysiloxanes. According to the present invention, the surfactants are used in quantities of up to 1 wt.-%, for example, of 0.1 to 0.75 wt.-%, in relation to the total weight of the coating material.

The primer coating materials can also contain up to 10 wt.-%, for example, 3 to 7 wt.-% of one or more white pigments in relation to the total weight of the coating material, without the demanded properties being affected. The advantage of white-pigmented primer coatings is that the usual white ink coating, which is often applied under the color printing in order to provide an improved print image, can be saved. Suitable white pigments are titanium dioxide, lithopones, zinc oxide, and zinc sulphide. Titanium dioxide and zinc sulphide are thereby preferred.

Suitable difunctional, alcoxylated acrylate monomers are ethoxylated and propoxylated acrylate monomers. Ipropylene glycol diacrylate DPGDA, tripropylene glycol diacrylate TPGDA, tetraethylene glycol diacrylate TTEGDA and their mixtures can, for example, be used as difunctional, alcoxylated acrylate monomers. According to the present invention, the difunctional alcoxylated acrylate monomers can, for example, be used in quantities of 60 to 87 wt.-%, for example, of 62 to 70 wt.-%, in relation to the total weight of the coating material.

Suitable acrylate oligomers are epoxy acrylates, urethane acrylates, and polyether acrylates. Aliphatic epoxy acrylates, urethane acrylates, and polyether acrylates can, for example, be used. According to the present invention, the acrylate oligomers can, for example, be used in quantities of 8 to 13 wt.-%, for example, of 9 to 11 wt.-%, in relation to the total weight of the coating material.

Suitable carbonyl-functional acrylate and methacrylate oligomers are carboxy-functional acrylate and methacrylate oligomers as well as carboxylate-functional acrylate and methacrylate oligomers. Suitable polyethylene glycol acrylates are polyethylene glycol diacrylates such as PEG (200) DA, PEG (400)DA and PEG (600)DA. The molar mass (number average) of the PEG structure in the acrylate-functional oligomer can, for example, amount to 100 to 2000, for example, 150 to 1000, for example, 200 to 600 daltons. According to the present invention, the carbonyl-functional acrylate and/or methacrylate oligomers can, for example, be used in quantities of 6 to 14 wt.-%, for example, 8 to 12 wt.-%, in relation to the total weight of the coating material. According to the present invention, the polyethylene glycol acrylates and/or polyethylene glycol methacrylates can, for example, be used in quantities of 6 to 14 wt.-%, for example, 8 to 12 wt.-%, in relation to the total weight of the coating material.

Suitable photoinitiators are (1-hydroxycyclohexyl) phenyl ketone, 2-hydroxy-2-methylpropiophenone, 1-[4-(2-hydroxyethoxy)-phenyl]-2-hydroxy-2-methyl-1-propan-1-one, 2-hydroxy-1-{4-[4-(2-hydroxy-2-methylpropionyl)-benzyl]-phenyl}-2-methylpropan-1-one, 2-benzyl-2-dimethylamino-1-(4-morpholinophenyl)-butan-1-one, 2,4,6-trimethylbenzoyl)-phenylphosphine oxide, phenylglyoxylic acid methyl ester, ethyl-2,4,6-trimethylbenzoyl-diphenylphosphinate, 2,4-diethyl thioxanthone, 1-chloro-4-propoxythioxanthone. Bis(2,4,6-trimethylbenzoyl)-phenylphosphine oxide, 2,4,6-trimethylbenzoyl-diphenylphosphine oxide, and 2-hydroxy-1-{4-[4-(2-hydroxy-2-methylpropionyl)-benzyl]-phenyl}-2-methylpropan-1-one can, for example, be used as photoinitiators. According to the present invention, the photoinitiators can, for example, be used in quantities of 1.2 to 8 wt.-% in relation to the total weight of the coating material.

The primer coating materials can also contain the auxiliary agents and additives known to and commonly used by a skilled person, such as polymerization inhibitors and defoaming agents.

Coatings are produced from the coating materials according to the present invention which are used as a primer layer in recyclable coating systems for the decoration of plastic surfaces. The first layer of a coating system which is applied onto a substrate is hereafter referred to as the primer layer.

A further embodiment of the present invention relates to coating systems consisting of a primer layer and a decorative layer. The primer layer here contains one or more coatings which are made from at least one primer coating material. The decorative layer contains one or more ink coatings which are made from at least one ink. One or more UV-curing inks which are suitable for inkjet printing are used to produce the ink coatings. The inkjet inks contain pigments, oligomers, photoinitiators and reactive diluents. The inkjet inks may also contain additives known to and commonly used by a skilled person.

The primer coatings according to the invention contain acid and hydrophilic groups. These work as "predesigned breaking points" between primer and substrate in an alkaline solution. The coating system is completely disbonded from the substrate under the common alkaline conditions of the washing processes which the plastic flakes are exposed to while being cleaned during the recycling process. The coating system may be removed from the washing process in a relatively connected form, so that a carry-over to the next process steps is avoided.

Inkjet printing methods are usually not used for direct printing on recyclable PET molded containers. These methods are in fact used for printing on labels which are then fixed on the plastic containers. The coating systems known so far neither show the necessary initial adhesion to the substrate nor the necessary water resistance.

In an embodiment, the present invention provides a process for printing on recyclable plastic substrates via inkjet printing which comprises the following steps:

(a) application of at least one primer coating material according to the present invention via inkjet printing;

(b) pinning of the primer coating by exposure to UV radiation;

(c) application of at least one UV-curing ink via inkjet printing; and (d) curing of all coatings by exposure to UV radiation.

The UV-curing primer coating materials and inks are applied with commercially available inkjet printers, in particular with printers which are suitable for industrial printing on molded bodies. UV light-emitting diodes (LED) or mercury vapor lamps can be used to generate the UV radiation.

The terms "pre-gelling" and "pinning" as used herein refer to the fixation of a coating material by a pre-reaction. The coating material is pre-gelled, i.e., it is pre-cured to such a degree that is no longer liquid and has already produced a sufficiently solid coating. This sufficiently solid coating has not, however, yet fully cured. Pinning prevents the undesirable running of the liquid coating materials and improves adhesion of the fully cured coatings among each other.

For pre-gelling or pinning in step (b), LED spotlights are used as source of radiation which emit radiation with a wavelength of 385 or 395 nm. The power amounts to 2 to 5 W. Irradiation having a dose in the range of 20 to 100 mJ/cm$^2$ is thereby provided.

In an embodiment of the present invention, a further ink layer, for example, a white ink layer, can be applied and pre-gelled in order to improve the print image before curing of the complete layer construction in step (d).

In the last step (d), the complete layer construction consisting of primer layers and ink layers is cured completely via radiation having wavelengths ranging from 180 to 450 nm. The radiation used can, for example, be generated by UV light-emitting diodes (LED) or by mercury vapor lamps. Medium pressure mercury lamps having a power of 200 to 500 W/cm can, for example, be used. Irradiation having a dose in the range of 500 to 2000 mJ/cm$^2$ can, for example, be provided.

The process according to the present invention is particularly suitable for printing on PET substrates, in particular for printing on molded bodies for food packaging such as beverage bottles. The PET substrates can be pretreated prior to printing, for example, by flame treatment or by a plasma pretreatment. This improves the optical appearance and the gradient and image print of the coating. An improved adhesion on the substrate is also achieved.

The process according to the present invention can be integrated into production lines. Since both the primer and the inkjet inks are applied via inkjet printing, one print module can be used in inline processes.

EXAMPLE

Example Recipes for Primer Coating Materials

| Component | Example 1 Quantity [wt.-%] | Example 2 Quantity [wt.-%] |
|---|---|---|
| Dipropylene glycol diacrylate | 0.0 | 64.0 |
| Tripropylene glycol diacrylate | 69.8 | 0.0 |
| Monofunctional aliphatic epoxy acrylate | 10.0 | 10.0 |
| Difunctional acid acrylate | 15.0 | 0.0 |
| Polyethylene glycol (400) diacrylate | 0.0 | 10.0 |
| 2-hydroxy-1-{4-[4-(2-hydroxy-2-methylpropionyl)-benzyl]-phenyl}-2-methylpropan-1-one | 1.0 | 2.0 |
| 2,4,6-trimethylbenzoyl-diphenylphosphine oxide | 2.0 | 3.0 |
| Bis(2,4,6-trimethylbenzoyl)-phenylphosphine oxide | 2.0 | 2.0 |
| Silicone polyether acrylate | 0.2 | 0.2 |
| Pigment white 7 | 0.0 | 7.8 |
| Polymeric dispersing additive | 0.0 | 1.0 |

Printing Method

A commercially available inkjet printing plant for rotationally symmetric bodies with a print head type Konica Minolta KM1024 was used for printing. Commercially available PET round bottles were printed, with 200 bottles being printed with primer coatings according to Example 1, and 200 bottles being printed with primer coatings according to Example 2. In a first step, the primer coating materials were imprinted with a resolution of 360×360 dpi with a printing speed of 15 m/min. A pinning of the imprinted coatings via an LED spotlight with a power of 2 W at a wavelength of 395 nm was then preformed. Commercially available white UV-curing inkjet inks were imprinted on the pre-gelled primer coatings with a resolution of 360×360 dpi and a printing speed of 15 m/min. A pinning of the imprinted coatings was then performed via an LED spotlight with a power of 2 W at a wavelength of 395 nm. Commercially available UV-curing inkjet color inks were imprinted on the pre-gelled white ink coatings with a resolution of 360×360 dpi with a printing speed of 15 m/min. All imprinted and pre-gelled coatings were then completely cured with radiation using a medium-pressure mercury lamp with a power of 270 W/cm.

Determination of Scratch Resistance

A weight-loaded scratch stylus (model Erichsen-4355) was placed with its tip on the coating to be tested and was then, vertically upright, pulled over the surface to be tested. A visual assessment was then performed as to whether the tested coating had a scratching track. The maximum mass of the weight with which the scratch stylus can be loaded without the coating being damaged during the test is a measure of the scratch resistance of the coating. Results of more than 10 Newton mass of weight are considered to be good.

Determination of Adhesion (Cross-Cut Test)

For a cross-cut, six parallel cuts were applied to the coating of the specimens with a cutter knife. The cuts in the coating were thereby so deep that they reached the substrate surface without damaging it. Six further parallel cuts were then applied which were perpendicular to the first ones so as to form an even square or lattice. The grid spacing was 1 mm. A clear or crepe tape strip with an adhesive force of 8 to 10 N/25 mm was stuck onto the resulting square. This was then removed at an angle of 60° in a time of 0.5 to 1 s. The grid or coating was then assessed visually. The grid cut characteristic value Gt 0 thereby corresponds to a very good adhesive strength, and the characteristic value Gt 5 corresponds to a very poor adhesive strength.

Determination of Adhesion (Tape Test)

On the coated specimen, an adhesive tape strip (type Tesa-Film 57370-00002) was fixed on the coating to be tested using light pressure and avoiding inclusions of air. After a wait of 10 seconds, the adhesive tape strip was removed at an angle of 60° and visually assessed. The result is okay if no residues could be seen on the adhesive tape strip.

Determination of Water Resistance

The coated specimen was completely immersed into distilled water for 15 minutes at a temperature of 20° C. The scratch resistance and adhesion (tape test and cross-cut test) of the specimen were checked immediately after its removed from the water, i.e., without reconditioning.

Recycling Test

The printed PET bottles were shredded to flakes. 500 g of the flakes were then mixed with 2l of an alkaline washing solution. The washing solution was produced from 2l water, 20 g sodium hydroxide, and 6 g surfactant (Triton X100, product of Dow Chemicals). The mixture was stirred with 1000 rpm for 15 minutes at a temperature of 88° C. and then filtered. The degree of separation of the printing from the flakes was then assessed visually.

The results of the tests are summarized in Tables 1 and 2 below:

TABLE 1

Results Example Recipe 1

| Test | Result immediately after curing | Result after immersion in water |
|---|---|---|
| Scratch resistance | >10N | >10N |
| Cross-cut test | Gt 0 | Gt 0 |
| Tape test | no residues | no residues |
| Recycling test | complete separation | complete separation |

TABLE 2

Results Example Recipe 2

| Test | Result immediately after curing | Result after immersion in water |
|---|---|---|
| Scratch resistance | >10N | >10N |
| Cross-cut test | Gt 0 | Gt 0 |
| Tape test | no residues | no residues |
| Recycling test | complete separation | complete separation |

The primer coatings according to the present invention lead to scratch-resistant and waterproof coatings which can be removed completely in the usual cleaning steps within the recycling processes.

The present invention is not limited to embodiments described herein; reference should be had to the appended claims.

What is claimed is:

1. A coating material for the production of a UV-curing primer coating, the coating material comprising:
   60 to 80 wt.-% of at least one difunctional, alcoxylated acrylate monomer;
   5 to 15 wt.-% of at least one acrylate oligomer;
   5 to 15 wt.-% of at least one of at least one carbonyl-functional acrylate and at least one methacrylate oligomer; and
   1 to 10 wt.-% of at least one photoinitiator,
   each based on a total weight of the coating material, wherein,
   the coating material comprises a viscosity which allows the coating material to be applied via an inkjet printing, and
   the coating material is provided as a one component coating material.

2. The coating material as recited in claim 1, further comprising:
   0.1 to 1 wt.-% of at least one surfactant based on the total weight of the coating material.

3. The coating material as recited in claim 2, wherein the at least one surfactant is at least one of a poly(organo)siloxane and a polyether-substituted polysiloxane.

4. The coating material as recited in claim 1, further comprising:
up to 10 wt.-% of at least one white pigment based on the total weight of the coating material.

5. The coating material as recited in claim 4, wherein the at least one white pigment is a titanium dioxide, lithopone, a zinc oxide, zinc sulfide, and mixtures thereof.

6. The coating material as recited in claim 1, wherein the at least one difunctional, alcoxylated acrylate monomer is an ethoxylated and propoxylated acrylate monomer and mixtures thereof.

7. The coating material as recited in claim 1, wherein the at least one difunctional, alcoxylated acrylate monomer is dipropylene glycol diacrylate DPGDA, tripropylene glycol diacrylate TPGDA, tetraethylene glycol diacrylate TTEGDA, and mixtures thereof.

8. The coating material as recited in claim 1, wherein the at least one acrylate oligomer is an epoxy acrylate, a urethane acrylate, a polyether acrylate, and mixtures thereof.

9. The coating material as recited in claim 8, wherein the epoxy acrylate is an aliphatic epoxy acrylate.

10. The coating material as recited in claim 1, wherein at least one carbonyl-functional acrylate and the at least one methacrylate oligomer is a carboxy-functional acrylate oligomer, a carboxy-functional methacrylate oligomer, a carboxylate-functional acrylate oligomer, a carboxylate-functional methacrylate oligomer, and mixtures thereof.

11. The coating material as recited in claim 1, wherein the at least one photoinitiator is 1-hydroxycyclohexyl)phenyl ketone, 2-hydroxy-2-methylpropiophenone, 1-[4-(2-hydroxyethoxy)-phenyl]-2-hydroxy-2-methyl-1-propan-1-one, 2-hydroxy-1-14-[4-(2-hydroxy-2-methylpropionyl)-benzyl]-phenyl}-2-methylpropan-1-one, 2-benzyl-2-dimethylamino-1-(4-morpholinophenyl)-butan-1-one, 2,4,6-trimethylbenzoyl-phenylphosphine oxide, phenylglyoxylic acid methyl ester, ethyl-2,4,6-trimethylbenzoyl-diphenylphosphinate, 2,4-diethyl thioxanthone, 1-chloro-4-propoxythioxanthone, bis(2,4,6-trimethylbenzoyl)-phenylphosphine oxide, and mixtures thereof.

12. A method for printing a recyclable plastic substrate, the method comprising the steps of:
providing the recyclable plastic substrate;
applying at least one coating material as recited in claim 1 as a primer coating to the recyclable plastic substrate via an inkjet printing;
pinning the primer coating via a radiation with UV rays;
applying at least one UV-curing ink to the pinned primer coating via the inkjet printing; and
curing the pinned primer coating and the at least one UV-curing ink applied thereon via a radiation with UV rays.

13. The method as recited in claim 12, wherein the radiation with UV rays for curing the pinned primer coating and the at least one UV-curing ink applied thereon is UV radiation having a wavelength of between 180 to 450 nm.

14. The method as recited in claim 12, wherein the recyclable plastic substrate is a PET substrate.

15. A coating material for the production of a UV-curing primer coating, the coating material comprising:
60 to 80 wt.-% of at least one difunctional, alcoxylated acrylate monomer;
5 to 15 wt.-% of at least one acrylate oligomer;
5 to 15 wt.-% of at least one of at least one polyethylene glycol acrylate and at least one polyethylene glycol methacrylate;
1 to 10 wt.-% of at least one photoinitiator; and
0.1 to 1 wt.-% of at least one surfactant,
each based on a total weight of the coating material,
wherein,
the coating material comprises a viscosity which allows the coating material to be applied via an inkjet printing and
the coating material is provided as a one component coating material.

16. The coating material as recited in claim 15, wherein the at least one surfactant is at least one of a poly(organo)siloxane and a polyether-substituted polysiloxane.

17. The coating material as recited in claim 15, further comprising:
up to 10 wt.-% of at least one white pigment based on the total weight of the coating material.

18. The coating material as recited in claim 17, wherein the at least one white pigment is a titanium dioxide, lithopone, a zinc oxide, zinc sulfide, and mixtures thereof.

19. The coating material as recited in claim 15, wherein the at least one difunctional, alcoxylated acrylate monomer is an ethoxylated and propoxylated acrylate monomer and mixtures thereof.

20. The coating material as recited in claim 15, wherein the at least one difunctional, alcoxylated acrylate monomer is dipropylene glycol diacrylate DPGDA, tripropylene glycol diacrylate TPGDA, tetraethylene glycol diacrylate TTEGDA, and mixtures thereof.

21. The coating material as recited in claim 15, wherein the at least one acrylate oligomer is an epoxy acrylate, a urethane acrylate, a polyether acrylate, and mixtures thereof.

22. The coating material as recited in claim 21, wherein the epoxy acrylate is an aliphatic epoxy acrylate.

23. The coating material as recited in claim 15, wherein the at least one polyethylene glycol acrylate is polyethylene glycol diacrylate.

* * * * *

UNITED STATES PATENT AND TRADEMARK OFFICE
CERTIFICATE OF CORRECTION

| | | |
|---|---|---|
| PATENT NO. | : 11,702,549 B2 | |
| APPLICATION NO. | : 16/644959 | |
| DATED | : July 18, 2023 | |
| INVENTOR(S) | : De Rossi et al. | |

It is certified that error appears in the above-identified patent and that said Letters Patent is hereby corrected as shown below:

In the Claims

In Claim 11, Column 7, Lines 35-36:
"2-hydroxy-1-14-[4-(2-hydroxy-2-methylpropionyl)-benzyl]-phenyl}-2-methylpropan-1-one"
Should read:
--2-hydroxy-1-{4-[4-(2-hydroxy-2-methylpropionyl)-benzyl]-phenyl}-2-methylpropan-1-one--.

Signed and Sealed this
Seventh Day of November, 2023

Katherine Kelly Vidal
*Director of the United States Patent and Trademark Office*